United States Patent [19]
Goldfarb et al.

[11] 3,791,886
[45] Feb. 12, 1974

[54] SOLDER FLUX COMPOSITION

[76] Inventors: Harold Goldfarb, 859 S. Penarth Ave., Walnut; Christopher Valsemakis, 22081 Susan St., Huntington Beach, both of Calif.

[22] Filed: Apr. 18, 1973

[21] Appl. No.: 352,146

Related U.S. Application Data

[63] Continuation of Ser. No. 201,135, Nov. 22, 1971, abandoned.

[52] U.S. Cl. .................................. 148/23, 260/635
[51] Int. Cl. ....................... B23r 35/34, C07c 31/20
[58] Field of Search ................ 148/23, 22; 260/635

[56] References Cited
UNITED STATES PATENTS

| | | | |
|---|---|---|---|
| 2,992,949 | 7/1961 | Melchiors | 148/23 |
| 3,436,278 | 4/1969 | Poliak | 148/23 |
| 2,664,371 | 12/1953 | Snell | 148/23 |
| 2,547,771 | 4/1951 | Pessel | 148/23 |
| 3,175,932 | 3/1965 | Brady | 148/23 |
| 2,829,998 | 4/1958 | Glynn | 148/23 |
| 3,575,738 | 4/1971 | Becker | 148/23 |
| 2,801,196 | 7/1957 | Doerr | 148/23 |
| 3,003,901 | 10/1961 | Marcell | 148/23 |
| 1,663,004 | 3/1968 | Green | 148/23 |
| 3,330,028 | 7/1967 | Elbreder | 148/23 |

FOREIGN PATENTS OR APPLICATIONS

| | | | |
|---|---|---|---|
| 1,007,039 | 10/1965 | Great Britain | 148/23 |

OTHER PUBLICATIONS

Poliak & Rausch, IBM Technical Disclosure Bulletin (July, 1970).

*Primary Examiner*—Charles N. Lovell
*Assistant Examiner*—Peter D. Rosenberg
*Attorney, Agent, or Firm*—H. Fredrick Hamann; G. Donald Weber, Jr.

[57] ABSTRACT

A fluxing composition suitable for soldering electrical connections and characterized by producing a bright and shiny solder joint comprising about 40 to 99 percent by weight of polypropylene glycol and 0.25 to 15 percent by weight phosphoric acid. An optional component in the fluxing composition is 0 to 50 percent by weight rosin.

5 Claims, No Drawings

SOLDER FLUX COMPOSITION

This is a continuation of application Ser. No. 201,135 filed Nov. 22, 1971 and now abandoned.

FIELD OF THE INVENTION

This invention relates to soldering fluxes and more particularly to fluxing compositions containing polypropylene glycol.

BRIEF DESCRIPTION OF PRIOR ART

In soldering electrical connections, the basic difficulty to be overcome is the removal of an oxide film which is formed on the surface of the metal by the solder. In order to establish a metal to metal contact between the metal being soldered and the solder, the oxide film must be removed either mechanically or chemically. The function of the fluxing composition is its use as a chemical means for removing the oxide film.

One of the primary problems with prior art flux composition is the splattering of the flux and/or solder which is caused by the violent volatilization of the flux composition when heated. Many commercially available solder fluxes utilize vehicles having low boiling points such as water, isopropyl alcohol, turpentine and the like. These low boiling vehicles volatilize below the melting temperature range of the soft solders commonly used, that is 120° to 310°C.

Another problem encountered with flux compositions is the tendency to leave a corrosive residue on electrical connections. The residues are formed when the flux vehicle vaporizes during the soldering steps. Such residues tend to promote electrolytic corrosion between the solder and the metal and may thus cause ultimate failure of the joint under unfavorable atmospheric conditions. Furthermore, in many cases it is difficult and impractical to wash or otherwise remove the flux residue. As a result, considerable effort has been made to provide flux compositions that leave non-corrosive residues or no residues at all or residues which can be readily removed by washing with organic solvents and/or water.

SUMMARY OF THE INVENTION

It is a primary object of this invention to provide an improved flux composition for soldering.

It is another object of this invention to provide a substantially splatter-free flux composition.

It is still another object of this invention to provide a flux composition which remains substantially liquid during the soldering step thereby facilitating its removal.

These and other objects of this invention are provided by a fluxing composition comprising 40 to 99 weight percent polypropylene glycol having a molecular weight range between 400 to 4,000, 0.25 to 15 weight percent phosphoric acid having sufficient water removed so as not to boil between a temperature of between 120° to 310°C, and 0 to 50 weight percent rosin. This fluxing composition is substantially free of splattering during the soldering operation, remains liquid after the soldering operation thereby facilitating its removal from the soldered connection and produces a bright and shiny solder joint which is substantially free of imperfections including gas pockets or air internal voids.

DETAILED DESCRIPTION OF THE EMBODIMENT

In general, this invention covers fluxing compositions containing 40 to 99 percent by weight of a polypropylene glycol having a molecular weight range between 400 to 4,000, 0.25 to 15 percent by weight phosphoric acid and 0 to 50 percent by weight rosin.

Polypropylene glycol is sold commercially as 1,2-propane-diol. The average molecular weight range is from 400 to 4,000. These polypropylene glycols have a boiling point of decomposition at temperatures from 300° to 450°C. The viscosities of these polypropylene glycols range from between 70 to 1150 cenistokes at 25°C. The polypropylene glycols used in these fluxing compositions are non-toxic, substantially non-hygroscopic and remain liquid within the melting temperature range of 120° to 310°C commonly found for soft solders. The preferred concentration range of polypropylene glycol is 55 to 80 weight percent.

The phosphoric acid component is ortho phosphoric acid in which sufficient water of hydration is removed therefrom so that no splattering of the fluxing composition or solder results therefrom. Typically, commercially available ortho phosphoric acid contains about 86 percent ortho phosphoric acid and 14 percent water as water of hydration. In a preferred embodiment, the commercially available ortho phosphoric acid containing 86 percent ortho phosphoric acid is mixed with the polypropylene glycol and heated to a temperature of about 150°C. During this heating step, some of the water of hydration is removed. The preferred concentration of phosphoric acid is 3 to 7 weight percent when phosphoric acid is the only active component in the flux composition. When phosphoric acid and rosin are used in combination, the preferred concentration of phosphoric acid is 1 to 3 weight percent and the preferred concentration of the rosin is 20 to 40 weight percent. Concentrations of phosphoric acid higher than 10 percent tend to darken the color of the fluxing solution. Fluxing compositions containing 10 to 15 percent orthophosphoric acid are dark colored and tend to leave a dark residue on the solder joint. These fluxing compositions will work, however, having the aforementioned disadvantage of a dark residue.

In some applications it is desirable to include the rosin as a component along with orthophosphoric acid in the fluxing composition. Fluxing compositions which are rosin free can be readily removed by washing with water. Fluxing compositions containing rosin yield a residue which is removed by washing with organic solvents.

The fluxing composition removes the oxide film from the metal to be soldered. At the same time, the fluxing composition protects the solder during the soldering operation to produce a bright shiny solder joint which is substantially free of internal gas pockets. The fluxing composition is substantially free of low-boiling solvents and hence does not cause any splattering during the soldering operation. The flux is a liquid and remains so during and after the soldering step. The liquid flux residue can be readily removed by washing with water or an organic solvent.

EXAMPLE 1

A mixture containing 97 grams polypropylene glycol having a molecular weight of 1010 and 3 grams of orthophosphoric acid were mixed and heated to a temperature of about 150°C for about thirty minutes. The resultant fluxing composition was applied with a hypodermic needle onto an assembled component lead in a plated-through hole of a circuit board and soldered. The bright shiny solder joint which was formed was substantially free of internal gas pockets. The solder flux did not splatter during the soldering operation.

Other examples of fluxing compositions are set forth in the following table:

| Example No. | Polypropylene Glycol, Wt. % | Ortho Phosphoric Acid, Wt. % | Rosin Wt. % |
| --- | --- | --- | --- |
| 2 | 49 | 1 | 50 |
| 3 | 74 | 1 | 25 |
| 4 | 55 | 5 | 40 |
| 5 | 65 | 10 | 25 |

We claim:

1. A non aqueous, liquid fluxing composition which is non splattering during soldering consisting of
   about 40 to 99 percent by weight of polypropylene glycol having an average molecular weight of 400 to 4,000 and which is non-volatile during said soldering,
   about 0.25 to 15 percent by weight orthophosphoric acid which is sufficiently dehydrated to enable said composition to be substantially splatter free during soldering, and
   the balance about 0 to 50 percent by weight of rosin.

2. A fluxing composition as described in claim 1 wherein the average molecular weight of said polypropylene glycol is between 700 and 1,500.

3. A fluxing composition as described in claim 1 wherein the concentration of said ortho phosphoric acid is 3 to 7 weight percent and the concentration of the rosin is 0 weight percent.

4. A fluxing composition as described in claim 1 wherein the concentration of the ortho phosphoric acid is 1 to 3 weight percent and the concentration of the rosin is 20 to 40 weight percent.

5. A fluxing composition as described in claim 1 wherein the concentration of the polypropylene glycol is 72 to 76 weight percent, the concentration of the ortho phosphoric acid is 0.5 to 2 weight percent and the concentration of the rosin is 24 to 26 weight percent.

* * * * *